Sept. 29, 1959 C. W. MUSSER 2,906,116
TOLERANCE MEASUREMENT ON SMALL BEARINGS
Filed Dec. 13, 1957
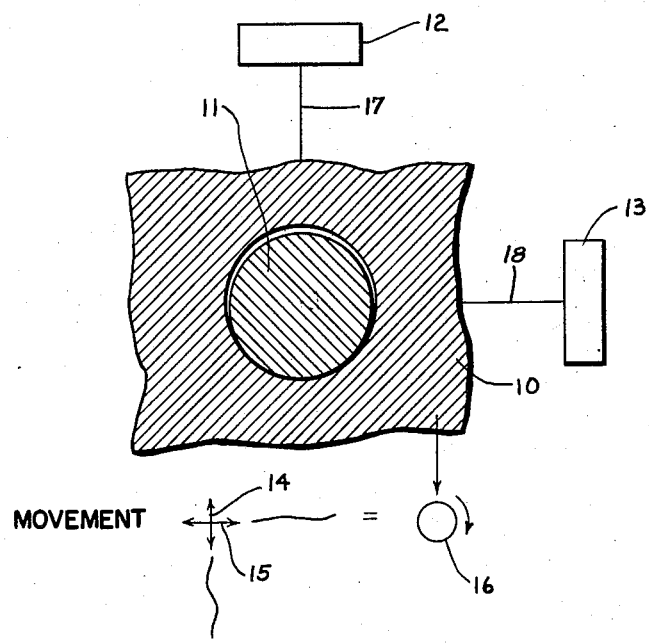
MOVEMENT
*INVENTOR.*
C WALTON MUSSER

2,906,116

TOLERANCE MEASUREMENT ON SMALL BEARINGS

C Walton Musser, Beverly, Mass.

Application December 13, 1957, Serial No. 702,742

3 Claims. (Cl. 73—67)

(Granted under Title 35, U.S. Code (1952), sec. 266)

The invention described herein may be manufactured and used by or for the Government for governmental purposes without the payment of any royalty thereon.

This invention relates to a method for effecting a very close clearance between a shaft and its bearing. It is particularly applicable to small shafts such as are used in watches, meters, instruments and the like.

In making small bearings and shafts, tolerances and clearances have to be something of the order of .001" in order to obtain the desired uniformity. This has heretofore involved a very costly manufacturing procedure and has sometimes made economical manufacture of such items impossible. The present invention avoids this difficulty by the provision of an improved method which involves placing the shaft in the bearing and subjecting the bearing to vibration of sonic frequency whereby the bearing hole is moved in a very small circular path at an exceedingly high velocity.

This circular movement of the bearing hole causes the shaft to rotate, and such rotation of the shaft has two desirable results. It burnishes the interior of the bearing hole, and it provides an indication of the clearance between the shaft and the bearing as hereinafter explained.

The invention will be better understood from the following description when considered in connection with the accompanying drawing and its scope is indicated by the appended claims.

The single figure of the drawing is a more or less diagrammatic showing of an arrangement for practicing the invention.

This figure illustrates a bearing 10 and a shaft 11. Mechanically coupled to the bearing 10 through drive shafts 17 and 18 are a pair of vibrators 12 and 13 arranged to apply to the bearing forces which are perpendicular to one another. These forces vary at the same frequency and are so phased that the bearing hole moves very rapidly in a circle of the order of a few thousandths of an inch in diameter as indicated at the bottom of the figure where the arrow 14 represents the forces applied by the vibrator 12, the arrow 15 represents the forces applied by the vibrator 13, and the resultant of these forces is indicated by the circle 16. The vibrators 12 and 13 may be mechanisms similar to those utilized in loud speakers.

As a result of this rotation of the bearing hole, the shaft 11 rotates on the inner periphery of the hole thereby burnishing the interior of the hole at a rate dependent on the weight of the shaft, the frequency of the vibration, the size of the bearing surfaces and their composition.

Since the shaft 11 rotates on the inner surface of the bearing hole and this hole is rotated at a constant speed, it follows that the rotational speed of the shaft will increase as the size of the bearing hole increases. The rotation of the shaft is therefore a function of the clearance between the shaft and the bearing for a given frequency.

The revolutions per minute of the shaft are very small as compared to the frequency of the vibrations and are readily observable. Consequently, it can be determined what rotational speed of the shaft corresponds to a given clearance between the shaft and the bearing.

As will be appreciated the herein described method of manufacture is applicable to the matching of parts shaped differently from those considered above. Thus in the manufacture of ball point pens, for example, it has effected a reduction in the rejects from about forty percent to substantially zero. Other applications will readily occur to those skilled in the art.

I claim:

1. In the production of a desired clearance between a bearing and a member rotatable in said bearing, the method which includes placing said member in said bearing, applying to said bearing rapidly vibrating forces whereby said bearing is moved as a whole at high speed in a small circle and said member is rotated upon contact with the surface of said bearing at a speed which is a function of the clearance between said bearing and said member, and measuring said speed.

2. In the production of a desired clearance between a bearing and a shaft rotatable in said bearing, the method which includes placing said shaft in said bearing, applying to said bearing rapidly vibrating forces whereby said bearing is moved as a whole at high speed in a small circle and said shaft is rotated upon contact with the surface of said bearing at a speed which is a function of the clearance between said bearing and said shaft, and measuring said speed.

3. In the production of a desired clearance between a bearing and a member rotatable therein, the method which includes placing said member in said bearing, subjecting said bearing vibrations of sonic frequency whereby it is moved in a very small circle at an exceedingly high velocity and said member is rotated at a speed which is a function of the clearance between said bearing and member, and measuring said speed.

References Cited in the file of this patent

UNITED STATES PATENTS

| | | |
|---|---|---|
| 1,641,447 | McGall | Sept. 6, 1927 |
| 2,426,089 | Fitzgerald | Aug. 19, 1947 |